Feb. 6, 1945.  C. F. MARSCHNER  2,368,717
COMPRESSION MOLD
Filed May 17, 1943

INVENTOR:
Charles F. Marschner,
by Carr Van Gravely
HIS ATTORNEYS.

Patented Feb. 6, 1945

2,368,717

UNITED STATES PATENT OFFICE 2,368,717

COMPRESSION MOLD

Charles F. Marschner, Normandy, Mo., assignor to McDonnell Aircraft Corporation, St. Louis, Mo., a corporation of Maryland Application May 17, 1943, Serial No. 487,297

1 Claim. (Cl. 18—42)

This invention relates to molds of the kind used principally for the compression molding of plastics and more particularly to the plunger or male die members of such compression molds. The invention has for its principal object to devise a simple and inexpensive plunger or male die member which will cooperate with the heated cavity or female die member of the compression mold to form a molded plastic part that is free from wrinkles and buckles and that may have accurately formed flanges, ribs and sharp radii thereon and openings therein. The invention consists in providing the plunger or male die member of the compression mold wtih a rigid hard-surfaced bottom section, preferably of molded plastic, a rigid top section, preferably of asbestos, and a resilient intermediate section, preferably of rubber bonded to said top and bottom plates. The invention also consists in the parts and in the arrangements and combinations of parts hereinafter described and claimed.

Figure 1:
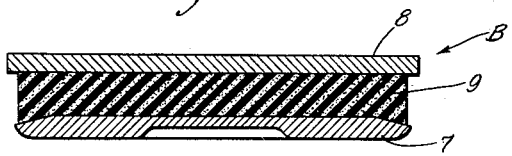
Figure 2:
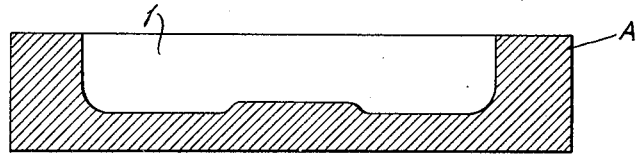
Figure 3:
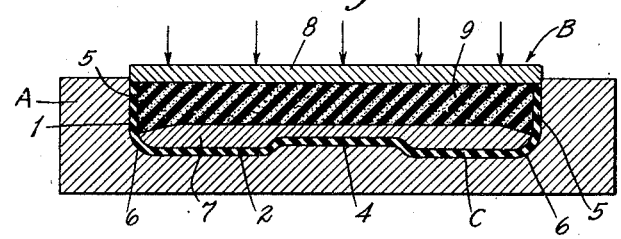
Figure 4:
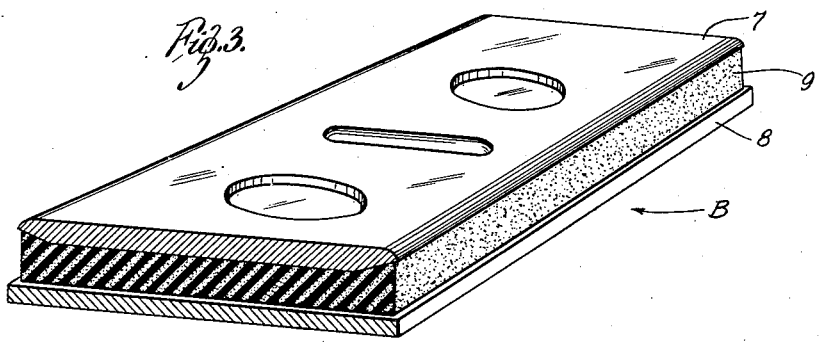

In the accompanying drawing, which forms part of this specification and wherein like symbols refer to like parts wherever they occur, Fig. 1 is a vertical sectional view of an open compression mold provided with a composite plunger or male die member embodying my invention, Fig. 2 is a vertical sectional view of the closed compression mold, showing the distribution of the molding pressure, Fig. 3 is a bottom perspective view of a portion of the male die member; and Fig. 4 is a perspective view of the plastic part formed in said compression mold.

The present compression mold comprises a heated female die member A, which is preferably made of metal and has a suitably shaped mold cavity or recess 1 in the top thereof, and a composite plunger or male die member B adapted to be engaged with or secured to a die press ram (not shown) for vertical movement into and out of said mold cavity or recess. As shown in the drawing, the mold cavity 1 and the male die member B may be shaped to form therebetween a plastic part C comprising a web 2 with one or more strengthening beads 3 and/or bosses 4 and side flanges 5 connected to said web by comparatively sharp bends or radii 6.

The composite plunger or male die member B of the compression mold comprises a rigid bottom section 7, a rigid top section 8 and a resilient intermediate section 9 interposed between and bonded to said top and bottom sections. The rigid bottom section 7 of the male die member B is preferably made in the form of a hard-surfaced plate of molded plastic adapted to cooperate with the similarly shaped lower portion of the mold cavity 1 of the female die member A to form the web 2, bead 3, bosses 4 and radii 6 of the molded plastic part C.

The rigid top or section 8 of the male die member B comprises a plate of plastic, metal, wood or other rigid material which fits within the top of the mold cavity and forms the marginal edges of the side flanges 5 of the molded part C. When made of metal the sides of the top plate 8 function as shear edges for pinch trimming the flash at said marginal edges of said side flanges. The top or backing plate 8, however, is preferably made of asbestos, which provides sufficient rigidity and an even distribution of the pressure and also serves as a heat insulator.

The resilient intermediate section of the plunger or male die member B of the compression mold is preferably made of rubber which is vulcanized to the plastic bottom plate 7 and to the asbestos top or backing plate 8 and cooperates with the side walls of the mold cavity 1 to form the side flanges 5 of the molded part C. This resilient member may, however, be made of synthetic rubber, plastic material, fibrous material impregnated with rubber, or any other material which is deformable and is capable of recovering its size and shape after deformation.

In operation, the molding compound is placed in the mold cavity 1 of the heated female die member A and the plunger or male die member B is forced downwardly into said mold cavity to form the plastic article or part C. The asbestos backing plate provides an even distribution of the molding pressure over the entire area of the resilient intermediate section 9 of the male die member B, while said resilient intermediate section evenly distributes such pressure over the entire area of the plastic bottom plate 7 of said male die member. The hard-surfaced bottom plate 7 prevents wrinkling or buckling of the web portion 2 of the molded plastic part C and accurately forms the bead 3 and bosses 4 therein and also the sharp bends or radii 6 that connect the side flanges 5 to said web. The vertical compression applied to the resilient intermediate section 9 of the male die member B causes said section to expand or flow laterally in a fluid-like manner towards the sides of the mold cavity 1, thus supplying the side pressure required to accurately form the vertical side flanges 5 of the molded part C. This lateral expansion of the resilient intermediate member 9 under the molding pressure also permits the formation of molded plastic parts with inwardly inclined side flanges or undercut portions. When the molding pressure is released, the resilient section 9 of the male die member B expands vertically and contracts laterally and thus recovers its original size and shape. The resilient section 9 of the male die B is normally of slightly less width than the bottom plate or section 7 thereof so as to facilitate the removal of the male die from the mold cavity 1 and the stripping of the finished plastic part C from said die after molding.

The plastic bottom plate 7 is preferably molded directly in the mold cavity 1 of the female die member A. While this manner of molding the bottom plate 7 does not initially provide the proper clearance space between said plate and the mold cavity 1, such clearance is obtained by incomplete curing of the bottom plate in the mold cavity and then completely curing the semi-cured plastic in said cavity by molding several plastic parts in the mold. During these first few molding operations the partly cured bottom plate will flow to the proper shape, and the heat from said molding operations will bring about a complete polymerization of the plastic and thus cause the plate to set or completely cure in the desired shape.

Obviously, the hereinbefore described compression mold admits of considerable modification without departing from the invention. Therefore, I do not wish to be limited to the precise arrangement shown and described.

What I claim is:

A mold for pressure molding a plastic article having a web with side flanges connected thereto by comparatively sharp radii, said mold comprising a metal female die member having a mold cavity therein and a male die member cooperating with said cavity for pressure molding said plastic article therein, said male die comprising a substantially rigid top section, a rigid hard-surfaced bottom section of molded plastic and a rubber intermediate section interposed between and vulcanized to said top and bottom sections, said rigid hard-surfaced molded plastic bottom section constituting the entire lower portion of said male die, whereby said intermediate rubber section cooperates with said die cavity to form the side flanges only of said plastic article and said rigid hard-surfaced molded plastic bottom section cooperates with said cavity to form the web of said plastic article and the relatively sharp radii thereof that connect said side flanges to said web.

CHARLES F. MARSCHNER.